(12) United States Patent
Lam et al.

(10) Patent No.: US 8,749,611 B2
(45) Date of Patent: Jun. 10, 2014

(54) VIDEO CONFERENCE SYSTEM

(75) Inventors: Barry Lam, Tao Yuan Shien (TW); Chia-Yuan Chang, Tao Yuan Shien (TW); Rong-Quen Chen, Tao Yuan Shien (TW); Chi-Cheng Chang, Tao Yuan Shien (TW); Huan-Tang Wu, Tao Yuan Shien (TW); Chih-Wei Sung, Tao Yuan Shien (TW); I-Chung Chien, Tao Yuan Shien (TW); Chih-Yin Lin, Tao Yuan Shien (TW); Ting-Han Huang, Tao Yuan Shien (TW); Juin-Yi Huang, Tao Yuan Shien (TW); Hsin-Lun Hsieh, Tao Yuan Shien (TW); Chao-Chueh Chang, Tao Yuan Shien (TW); Kang-Wen Lin, Tao Yuan Shien (TW); Chia-Yi Wu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 293 days.

(21) Appl. No.: 13/458,417

(22) Filed: Apr. 27, 2012

(65) Prior Publication Data

US 2013/0106978 A1    May 2, 2013

(30) Foreign Application Priority Data

Nov. 2, 2011    (TW) .............................. 100139909 A

(51) Int. Cl.
*H04N 7/14*        (2006.01)

(52) U.S. Cl.
USPC .................. 348/14.08; 348/14.09; 348/14.02; 348/14.05; 348/14.07

(58) Field of Classification Search
USPC ............................................ 348/14.01–14.16
See application file for complete search history.

(56) References Cited

U.S. PATENT DOCUMENTS

| 7,692,683 | B2 * | 4/2010 | Kenoyer et al. ............ 348/14.08 |
| 8,438,608 | B2 * | 5/2013 | Liwerant et al. .............. 725/115 |
| 2006/0001737 | A1 * | 1/2006 | Dawson et al. ............ 348/14.08 |
| 2008/0075095 | A1 * | 3/2008 | Suryanarayana et al. .... 370/401 |

* cited by examiner

*Primary Examiner* — Joseph J Nguyen
(74) *Attorney, Agent, or Firm* — McClure, Qualey & Rodack, LLP

(57) ABSTRACT

A video conference system built in an internet protocol (IP) network is provided. The system has: a multimedia capturing unit configured to photograph and output a first video signal; a DECT telephone configured to receive sounds and output a first audio signal; and a video conference terminal apparatus, including: an audio processing unit is an audio codec; a video processing unit is an video codec; and a network processing unit for transmitting a first network packet consisting of first audio/video streams generated by the audio/video processing units to the IP network, wherein the network processing unit receives a second network packet consisting of second audio/video streams from the IP network, wherein the second audio/video streams are decoded by the audio/video processing units, respectively, to generate second audio/video signals, which are displayed on the DECT telephone and a display apparatus, respectively.

27 Claims, 9 Drawing Sheets

VIDEO CONFERENCE SYSTEM

CROSS REFERENCE TO RELATED APPLICATIONS

This Application claims priority of Taiwan Patent Application No. 100139909, filed on Nov. 2, 2011, the entirety of which is incorporated by reference herein.

BACKGROUND OF THE INVENTION

1. Field of the Invention

The present invention relates to video conferences, and in particular relates to a video conference system and method thereof using a DECT phone for communications.

2. Description of the Related Art

In recent years, video conferencing has become important way to communicate between two remote users due to the development of network technologies and video compression technologies. In addition, the coverage area of wired and wireless networks have become very wide, and thus video communications using the internet protocol (IP) network is widely used. Although video conference services are provided by 3G cellular networks (e.g. the video phone protocol 3G-324M using the communications network), the popularity thereof is mute as the coverage area is limited and communications fees for services are very expensive. Thus, video conferencing using the 3G cellular network is not popular. Generally, it is necessary for a user to own a dedicated video conference system for convenience to conduct video conferencing with other users. However, video conference systems in the market are generally equipped with a camera, a microphone, and/or a remote controller, but the microphone is usually fixed and the remote controller may be limited to cover only a certain area, which may cause inconvenience for users in some conditions (e.g. the user needs to walk around).

BRIEF SUMMARY OF THE INVENTION

A detailed description is given in the following embodiments with reference to the accompanying drawings.

In an exemplary embodiment, a video conference system built in an internet protocol (IP) network is provided. The system comprises: a multimedia capturing unit configured to photograph and output a first video signal; a digital enhanced cordless telecommunications (DECT) telephone configured to receive sounds and output a first audio signal; and a video conference terminal apparatus, comprising: an audio processing unit configured to encode the first audio signal to a first audio stream; a video processing unit configured to encode the first video signal to a first video stream; and a network processing unit configured to convert the first audio stream and the first video stream to a first network packet, and transmit the first network packet to the IP network, wherein when the network processing unit receives a second network packet from the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus.

In another exemplary embodiment, a video conference terminal apparatus used in a video conference system built in an internet protocol (IP) network is provided. The apparatus comprises: an audio processing unit configured to encode a first audio signal received by a DECT telephone to a first audio stream; a video processing unit configured to encode a first video signal generated by a multimedia capturing unit to a first video stream; and a network processing unit configured to convert the first audio signal and the first video signal to a first network packet, and transmit the first network packet to the IP network; wherein when the network processing unit receives a second network packet from the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus.

In yet another exemplary embodiment, a video conference method applied in a video conference system built in an internet protocol (IP) network is provided. The video conference system comprises a multimedia capturing unit, a digital enhanced cordless telecommunications (DECT) telephone, and a video conference terminal apparatus, and the video conference terminal apparatus comprises an audio processing unit, a video processing unit and a network processing unit. The method comprises the following steps of: utilizing the multimedia capturing unit to output a first video signal; utilizing the DECT telephone to output a first audio signal; utilizing the audio processing unit to encode the first audio signal to a first audio stream; utilizing the video processing unit to encode the first video signal to a first video stream; utilizing the network processing unit to receive the first audio stream and the first video stream, convert the first audio stream and the first video stream to a first network packet, and transmit the first network packet to the IP network; when the network processing unit receives a second network packet from the IP network, utilizing the audio processing unit and the video processing unit to generate a second audio signal and a second video signal according to the second network packet, respectively; utilizing the audio processing unit to play the second audio signal on the DECT telephone; and utilizing the video processing unit to display the second video signal on a display apparatus.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
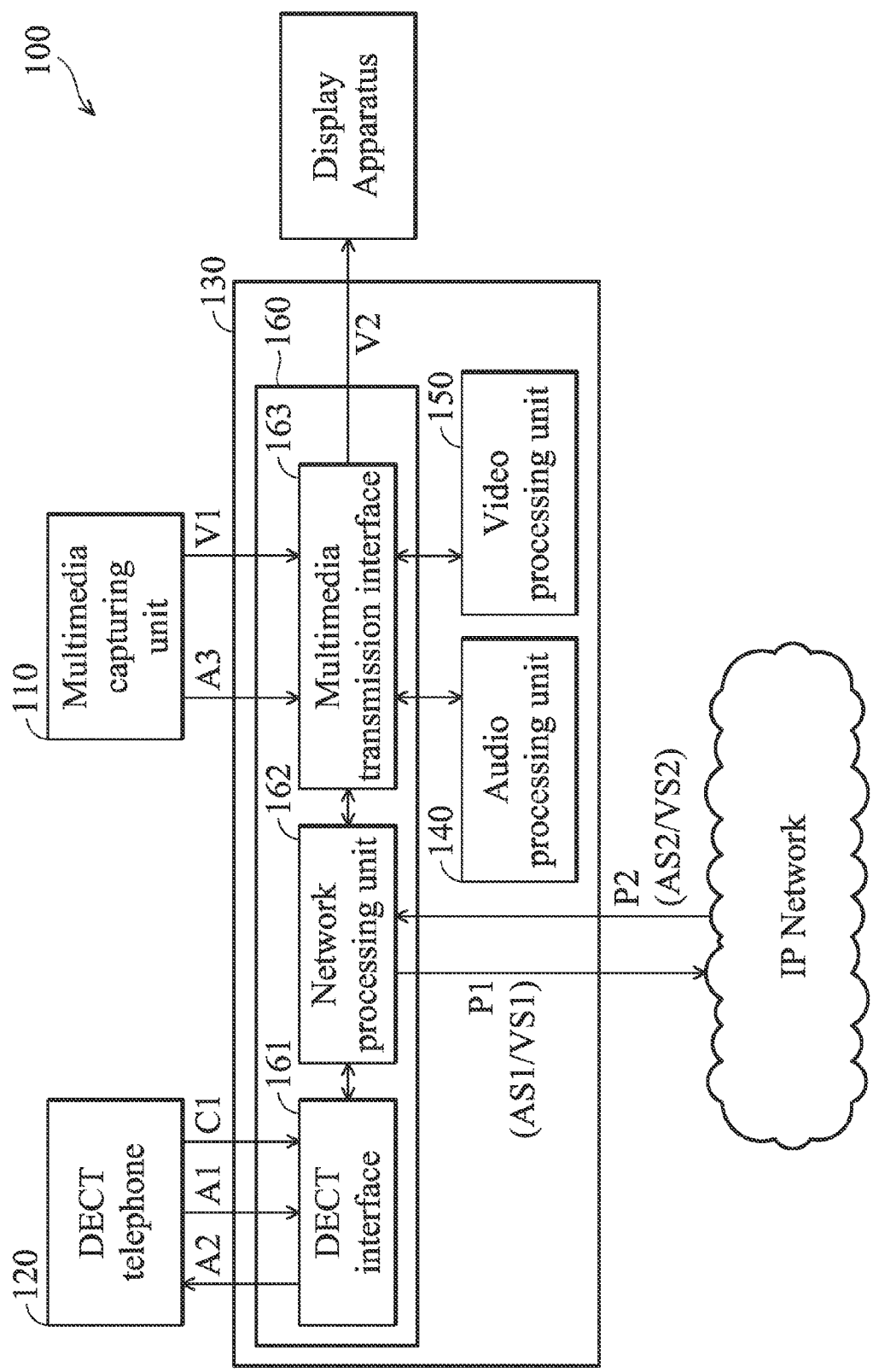
FIG. 1 illustrates a block diagram of the video conference system according to an embodiment of the invention.

FIG. 1 illustrates a block diagram of the video conference system according to an embodiment of the invention. The video conference system 100 may comprise a multimedia capturing unit 110, a digital enhanced cordless telecommunications telephone (DECT telephone hereafter) 120, and a video conference terminal apparatus 130. The video conference terminal apparatus 130 is configured to connect with another video conference terminal apparatus to exchange video signals and audio signals though an IP network (e.g. local network (LAN)), a radio telecommunications network, or a public switched telephone network, and the details will be described in the following sections. The multimedia capturing unit 110 can be a light-sensitive component (e.g. a CCD or CMOS sensor), configured to receive the images of a user and output a video signal V1 according to the images. The DECT telephone 120 is configured to receive the audio signal from a remote user through the video conference terminal apparatus 130, and play the audio signal. The multimedia capturing unit 110 may further comprise a microphone (not shown in FIG. 1), configured to receive sounds from the user, transmit the sounds of the user to the video conference terminal apparatus 130, and generate a control signal C1 to control the video conference terminal apparatus, wherein the sounds are further transmitted to a remote user by the video conference terminal apparatus 130, and the details thereof will be described later.

The video conference terminal apparatus 130, coupled to the multimedia capturing unit 110 and the DECT telephone 120, may comprise an audio processing unit 140, a video processing unit 150, and a network processing unit 160. The audio processing unit 140 is configured to receive the audio signal A1 outputted from the DECT telephone 120 through the network processing unit 160, and encode the audio signal A1 to an audio stream AS1. The video processing unit 150 is configured to receive the video signal V1 (and/or the audio signal A3) from the multimedia capturing unit 110 through the network processing unit 160, and encode the video signal V1 to a video stream VS1. The network processing unit 160 may further convert the video stream VS1 and the audio stream AS1 to a network packet P1, and transmit the network packet P1 to another video conference terminal apparatus through an IP network for exchanging the network packets, thereby conducting a video conference.

The network processing unit 160 may comprise a digital enhanced cordless telephone interface (DECT interface hereafter) 161, a network processing unit 162, and a multimedia transmission interface 163. The DECT telephone 120 may communicate with and transmit data to the video conference terminal apparatus 130 through the DECT interface 161 with the DECT protocol. The network processing unit 162 is configured to receive the video stream VS1 and the audio stream AS1 from the video processing unit 150 and the audio processing unit 140, respectively, and encode the video stream VS1 and the audio stream AS1 to a network packet P1, which is further transmitted to the video conference terminal apparatuses of other users in the IP network. The network processing unit 162 is compatible with various wired/wireless communications protocols, such as the local network (LAN), the intranet, the internet, the radio telecommunications network, the public switched telephone network, Wifi, the infrared ray, and Bluetooth, etc., but the invention is not limited thereto. The network processing unit 162 may further control the real-time media sessions and coordinate the network transfer flows between each user in the video conference. The multimedia transmission interface 163 is compatible with various transmission interfaces, such as USB and HDMI, for transmitting and receiving the video/audio signals.

Figure 2:
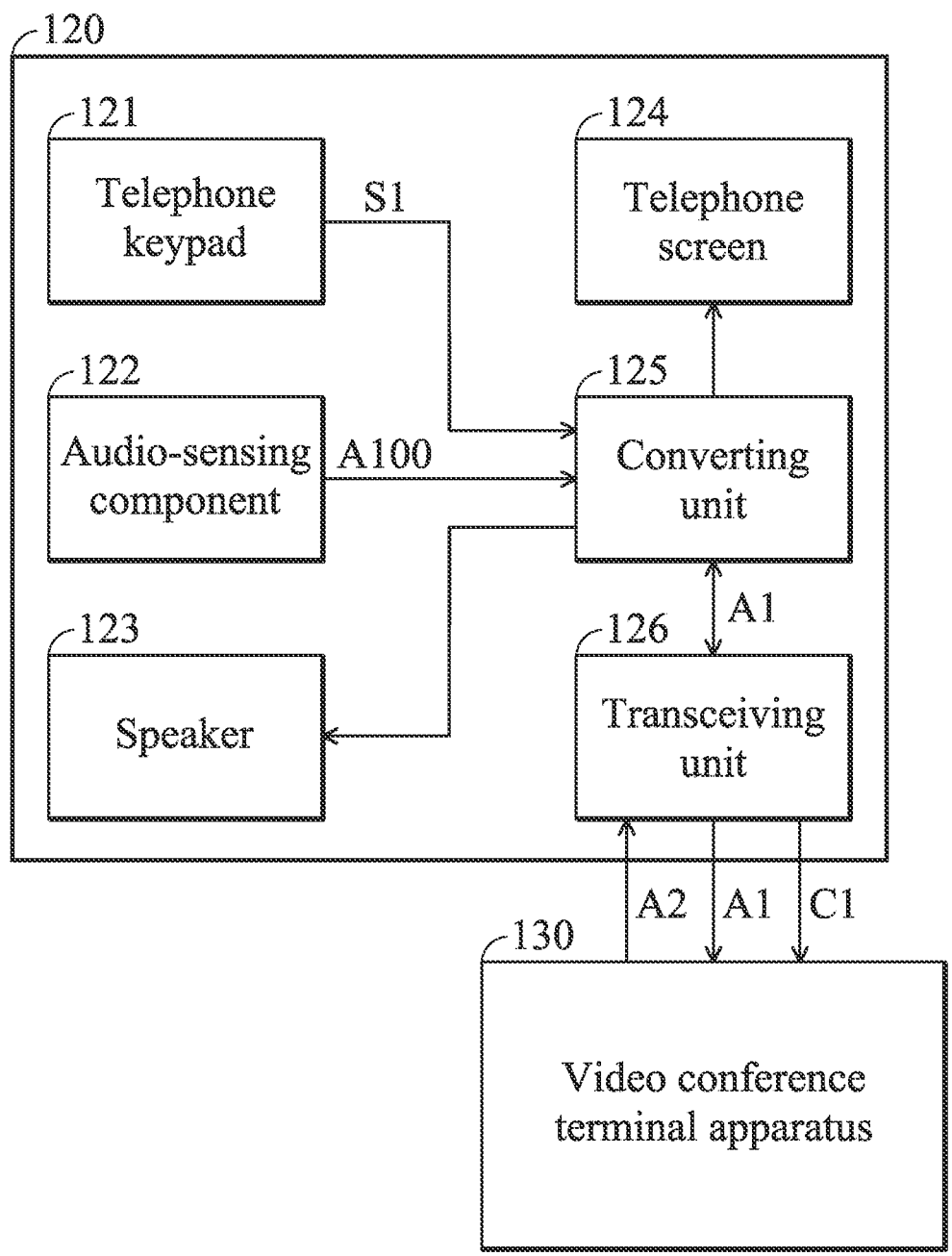
FIG. 2 illustrates a block diagram of the DECT telephone according to an embodiment of the invention.

As illustrated in FIG. 2, the DECT telephone 120 may comprise a telephone keypad 121, an audio-sensing component 122, a speaker 123, a telephone screen 124, a converting unit 125, and a transceiving unit 126. The telephone keypad 121 may comprise a numeric keypad (i.e. numpad) and telephone function buttons. A user may control the DECT telephone 120 by the telephone keypad 121, and control the video conference terminal apparatus 130 by the DECT telephone 120. For example, the user may operate the DECT telephone 120 by the telephone keypad 121, and the telephone keypad 121 may output a control signal S1 to the converting unit 125. The audio-sensing unit 122, such as a microphone, is configured to receive sounds of the user, and output an audio signal A100. The converting unit 125 is configured to receive the audio signal A100 and the control signal S1, and convert the audio signal A100 and the control signal S1 to the audio signal A1 and the control signal C1, respectively. Then, the transceiving unit 126 may transmit the audio signal A1 and the control signal C1 to the video conference terminal apparatus 130 with the DECT protocol to communicate and transfer data. In an embodiment, the DECT telephone 120 may further receive the user interface information encoded with the DECT protocol from the video conference terminal apparatus 130 through the transceiving unit 126, and display the user interface information, which is decoded by the converting unit 125, on the telephone screen 124.

Referring to FIG. 1, the audio processing unit 140 is an audio codec (i.e. audio encoder/decoder), configured to receive the audio signal A1 from the DECT telephone 120 through the DECT interface 161, and encode the received audio signal A1 to the audio stream AS1. The audio processing unit 160 may also decode the audio stream AS1 from the other user in the video reference, transmit the audio signal A2 decoded from the audio stream AS2 to the DECT telephone 120 through the DECT interface 161, and display the audio signal A1 on the speaker 123.

The video processing unit 150 may be a video codec (i.e. video encoder/decoder), configured to receive the video signal V1 from the multimedia capturing unit 110, and encode the video signal V1 to generate a video stream VS1. The video processing unit 150 may further transmit the video stream VS1 and the audio stream AS1 to the video conference terminal apparatus of another user in the video conference through the network processing unit 162. When the network processing unit 162 receives the network packet P2 from the other user in the video conference through the IP network, the audio processing unit 140 and the video processing unit 150 may further decode the audio stream AS2 and the video stream VS2 in the network packet P2, respectively, to generate the audio signal A2 and the video signal V2. The audio signal A2 is played on the DECT telephone 120, and the video signal V2 is displayed on a display apparatus. It should be noted that, the video processing unit 150 and the audio processing unit 140 can be implemented by hardware or software.

In another embodiment, the user may control the video conference terminal apparatus 130 by using the telephone keypad 121 of the DECT telephone 120, such as dialing the telephone numbers of other users in the video conference, controlling the angle of the camera, or alternating the settings of the screen. Specifically, the DECT telephone 120 may transmit the control signal to the video conference terminal apparatus 130 through the DECT interface 161 with the DECT protocol. The connection between the video conference terminal apparatus 130 and the multimedia capturing unit 110 can pass through the multimedia transmission interface 163, such as a wired interface (e.g. USB or HDMI) or a wireless interface (e.g. Wifi). The video conference terminal apparatus 130 can be connected to a display apparatus (e.g. a LCD TV) through the multimedia transmission interface 163, such as the HDMI interface or Widi (Wireless Display) interface, thereby the video screens of other users in the video conference and/or the control interface of the video conference terminal apparatus 130 can be displayed on the display apparatus, but the invention is not limited thereto.

In an embodiment, if the user A wants to conduct a video conference with the user B, the user A may use the DECT telephone 120 of the video conference terminal apparatus 130 to dial the telephone number of the video conference terminal apparatus 130 of the user B. Meanwhile, the video conference terminal apparatus 130 of the user A may receive the control message from the DECT telephone 120 through the DECT interface 161, and transmit the control message to the user B. When the video conference terminal apparatus 130 of the user B receives the phone call from the user A, the user B may respond to the phone call. Meanwhile, a video call can be built between the users A and B through the respective video conference terminal apparatus 130. The user A may use the DECT telephone 120 to capture the sounds thereof, and use the multimedia capturing unit 110 to capture the images thereof. Then, the audio processing unit 140 may receive the captured sounds of the user A through the DECT interface 161, and encode the captured sounds (i.e. the audio signal A1) to an audio stream AS1. The video processing unit 150 may encode the captured images of the user A (i.e. the video signal V1) to the video stream VS1. The audio stream AS1 and the video stream VS1 is transmitted to the video conference terminal apparatus 130 of the user B through the video conference terminal apparatus of the user B. On the other hand, the video conference terminal apparatus of the user B may decode the received audio stream AS1 and the video stream VS1. Then, the user B may transmit the audio signal A1 after the decoding process to the DECT telephone 120 through the DECT interface 161, thereby playing the audio signal A1. The user B may also display the video signal V1 after the decoding process on a display apparatus through the multimedia transmission interface 163 of the video conference terminal apparatus 130. It should be noted that the user B may also use the same procedure performed by the user A for exchanging video/audio signals to conduct the video conference.

In yet another embodiment, the multimedia capturing unit 110 may further comprise a microphone (not shown in FIG. 1) for capturing the sounds of the user, and outputting an output signal A3 according to the captured sounds. For example, referring to the procedure of the aforementioned embodiment, the user A may use the DECT telephone 120 or the microphone of the multimedia capturing unit 110 to capture the sounds thereof. The encoding process and transmission process of the audio/video signals is the same as those of the aforementioned embodiment. Then, the video conference terminal apparatus 130 of the user B may receive the audio stream AS1 and the video stream VS1 from the user A, which are decoded to generate the audio signal A1 and the video signal V1, respectively. The video conference terminal apparatus 130 of the user B may further transmit the audio signal A1 and the video signal V1 after the decoding process to a display apparatus (e.g. a LCD TV) through the multimedia transmission interface 163 (e.g. HDMI), thereby displaying the audio signal A1 and the video signal V1. Thus, the user B may hear the sounds of the user A and view the images of the user A on the display apparatus.

Figure 3:
FIG. 3 illustrates a diagram of the smart phone simulating the interface of the DECT telephone according to an embodiment of the invention.
Figure 4:
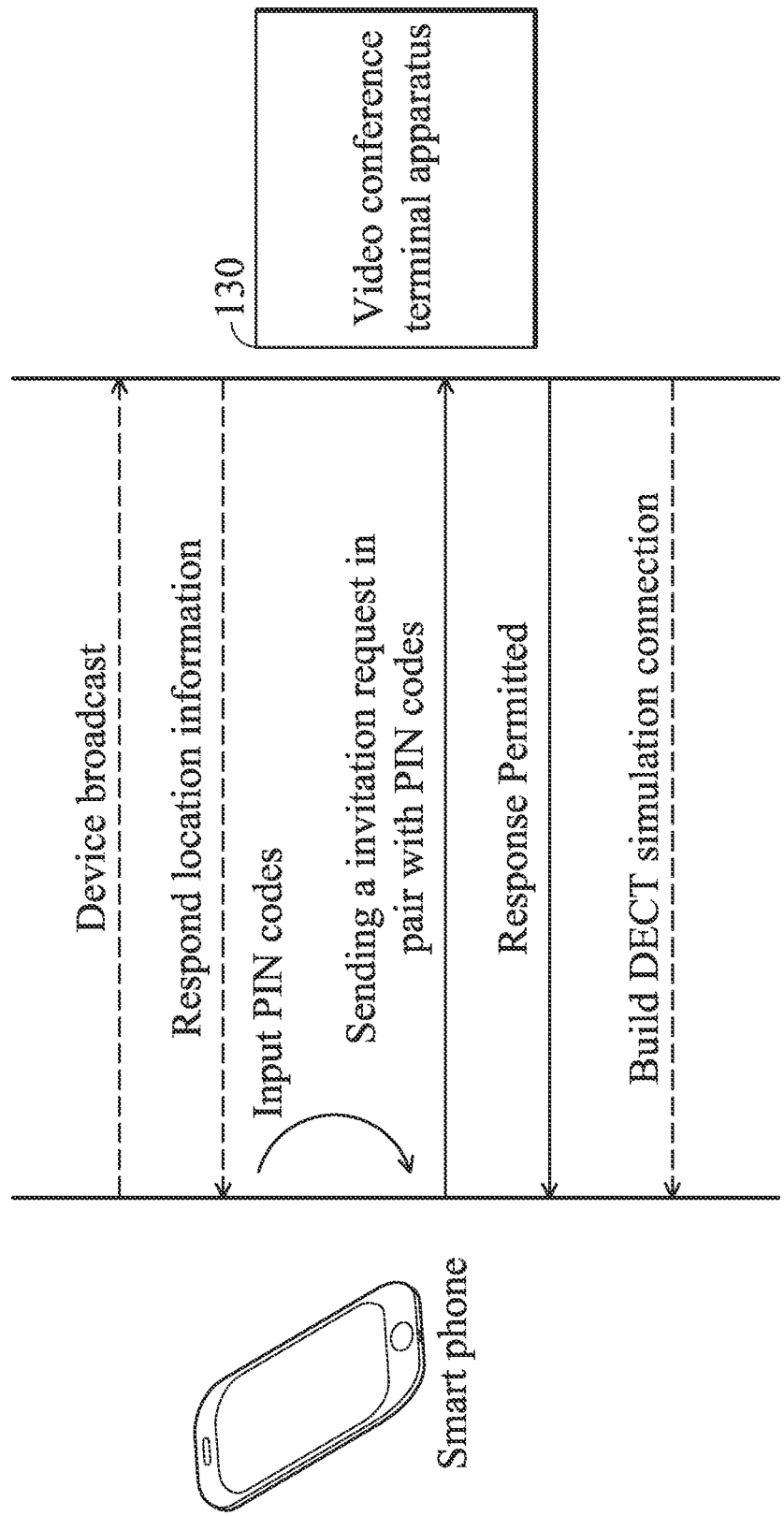
FIG. 4 illustrates a flow chart of executing the DECT simulation application on the smart phone according to an embodiment of the invention.

In an embodiment, the video conference terminal apparatus 130 of the invention may build a connection with a handheld device (e.g. a smart phone). For example, (a) the video conference terminal apparatus 130 may build a connection with a smart phone through the network processing unit 162 connected to a wireless router, or (b) the video conference terminal apparatus 130 may build a connection with a smart phone through the network processing unit 162 (e.g. Ad-Hoc interface, Bluetooth, Wifi, Infrared Ray, IEEE 1394, etc.). When the smart phone connects to the video conference terminal apparatus 130, the smart phone may execute a DECT simulation application to simulate the telephone keypad 121 and the user interface of the DECT telephone 120. The user may control the video conference terminal apparatus 130 on the smart phone through the same interface same as that of the DECT telephone 120 (as illustrated in FIG. 3). Meanwhile, the smart phone executing the DECT simulation application may replace the original DECT telephone 120. The procedure of the embodiment is shown in FIG. 4. First, the smart phone may send a broadcast signal. When the video conference terminal apparatus 130 receives the broadcast signal from the smart phone, the video conference terminal apparatus 130 may send the location information thereof back to the smart phone. Then, the user may input PIN codes on the smart phone, and send an invitation request to the video conference terminal apparatus 130. After the video conference terminal apparatus 130 receives the invitation request with PIN codes from the smart phone, the video conference terminal apparatus 130 may respond to the invitation request and build the connection with the smart phone.

In another embodiment, when the user A is viewing a TV program, there may be three different kinds of screens to be displayed, such as the screen of the TV program, the remote user B (remote screen), and the local user A (local screen). Meanwhile, the user A may adjust the picture-in-picture (PIP) mode of the screen displayed on the video conference terminal apparatus 130 by utilizing the buttons on the DECT telephone 120, thereby the screens from difference sources can be arranged in different layouts. Thus, the user A may view the TV program while conducting the video conference. For example, given that the local video signal, the remote video signal, the TV program video signal are V10, V20 and TV, respectively, the video conference terminal apparatus 130 may define various PIP modes, such as: (1) defining the TV program video signal TV as the background, and defining the local video signal V10 as the foreground; (2) defining the TV program video signal TV as the background, and defining the remote video signal V20 as the foreground; (3) defining the remote video signal V20 as the background, and defining the TV program video signal TV as the foreground; (4) defining the remote video signal V20 as the background, and defining the local video signal V10 as the foreground; (5) defining the local video signal V10 as the background, and defining the TV program video signal TV as the background; (6) defining the local video signal V10 as the background, and defining the remote video signal V20 as the foreground; (7) only defining the TV program video signal; (8) only defining the remote video signal V20; and (9) only defining the local video signal V10, etc., but the invention is not limited thereto. The display mode of the video conference terminal apparatus of the invention may also be a picture-by-picture (PBP) mode or a split-screen mode, etc. In an embodiment, the local video signal V10, local audio signal A10, the remote video signal V20, the remote audio signal A20 may be V1, A1, V2, and A2, respectively.

Figure 5:
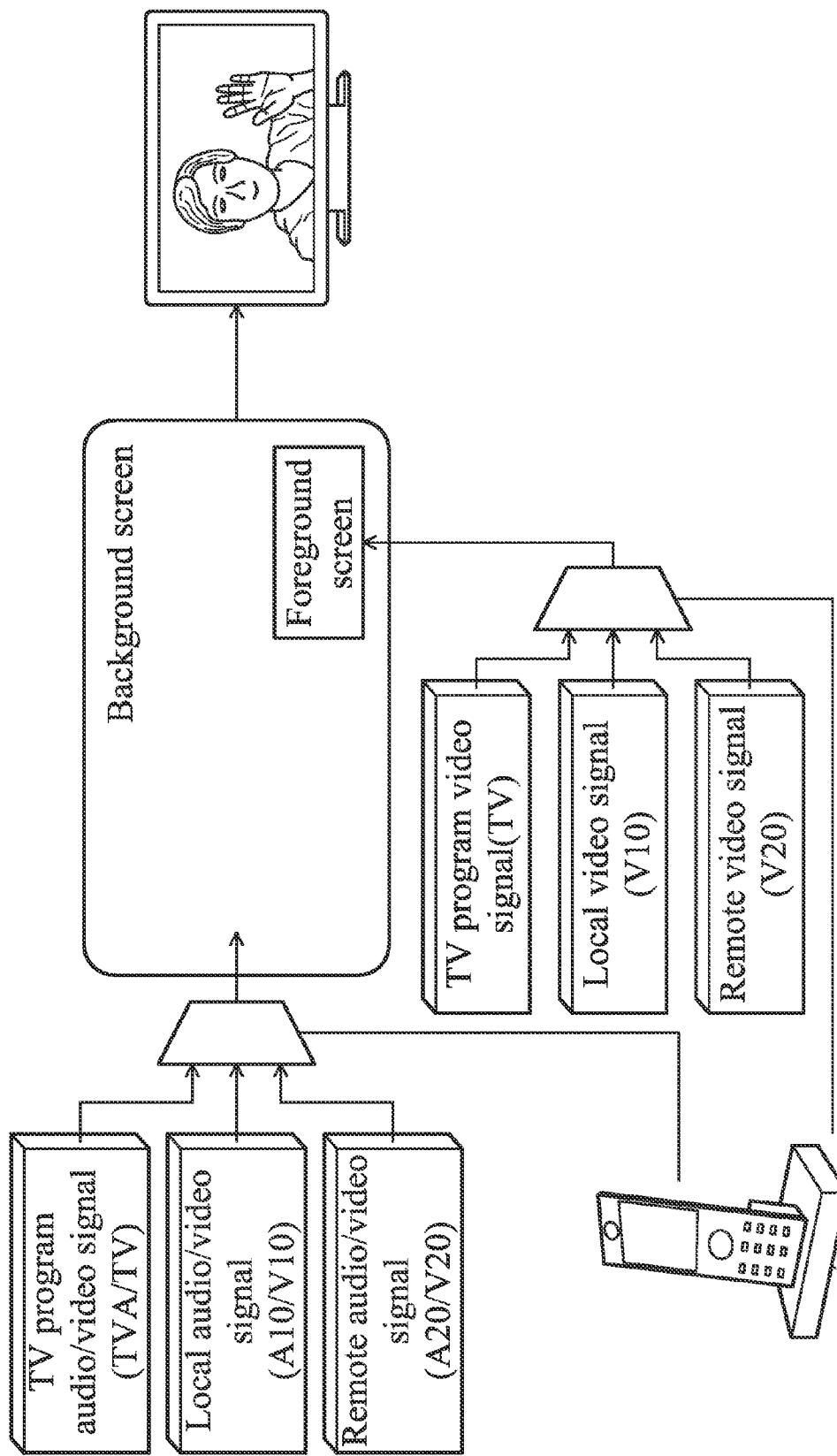
FIG. 5 illustrates a diagram of the picture-in-picture modes of the video conference terminal apparatus controlled by the DECT telephone according to an embodiment of the invention.

Further, when the multimedia capturing unit 110 captures the local video signal V10, the local video signal V10 is directly transmitted to the video conference terminal apparatus 130. When the video conference terminal apparatus 130 receives the video stream of the TV program and the video stream of the remote screen from the network processing unit 162, the TV program video signal TV and the remote video signal V20 decoded from the video streams can be transmitted to the video conference terminal apparatus 130. In another embodiment, the video conference terminal apparatus 130 may further comprise a signal switching processing unit (not shown in FIG. 1), configured to coordinate switching of video/audio signals from different sources, and synchronize the video/audio signals. For example, given that the local audio signal, the remote audio signal and the TV program audio signal are A10, A20, and TVA, respectively, and the PIP mode set by the user A is "(3) defining the remote video signal V20 as the background, and defining the TV program video signal TV as the foreground", and the signal switching processing unit may enlarge the remote video signal V20 to be a background screen, and shrink the TV program video signal TV to be a foreground screen, as illustrated in FIG. 5. Meanwhile, the audio signal played by the display apparatus is the remote audio signal A20. That is, the audio signal heard by the user is synchronous to the audio signal of the background screen. This embodiment merely describes the operation procedure of the display modes in the video conference terminal apparatus 130, but the invention is not limited thereto.

Figure 6:
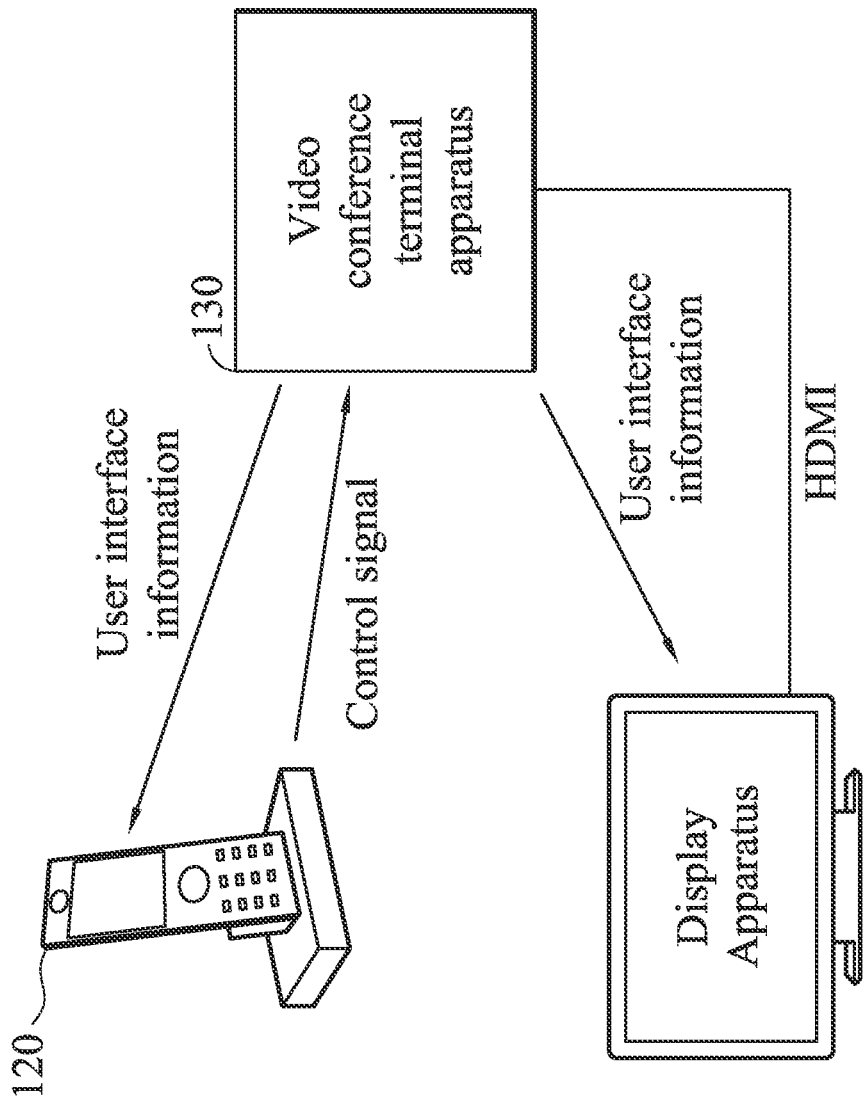
FIG. 6 illustrates a diagram of the video conference terminal apparatus transmitting the user interface display information simultaneously according to an embodiment of the invention.

In an embodiment, when the user controls the video conference terminal apparatus 130 by using the DECT telephone 120, the video conference terminal apparatus 130 may simultaneously transmit the display information or settings to the DECT telephone 120 and the display apparatus, as illustrated in FIG. 6. For example, the video conference terminal apparatus 130 may have a state machine (not shown), wherein the initial state of the state machine is state 1, which indicates whether the video conference terminal apparatus 130 is controlled by the DECT telephone 120. When the user controls the video conference terminal apparatus 130 by using the DECT telephone 120, the state machine goes to state 2, which indicates that the DECT phone 120 has control over the video conference terminal apparatus 130 and the video conference terminal apparatus 130 will simultaneously transmit the UI display information to the DECT telephone 120 and the display apparatus. When the user uses the DECT telephone 120 to dial up a telephone number, the user may view the UI display information and the dialed telephone number on both the DECT telephone 120 and the display apparatus simultaneously. It should be noted that the screens of the UI display information displayed on the DECT telephone 120 and the display apparatus may not be the same, but the information is synchronized, such as the IP address, the network mask, the gateway, and the DNS of the network processing unit 162.

Figure 7:
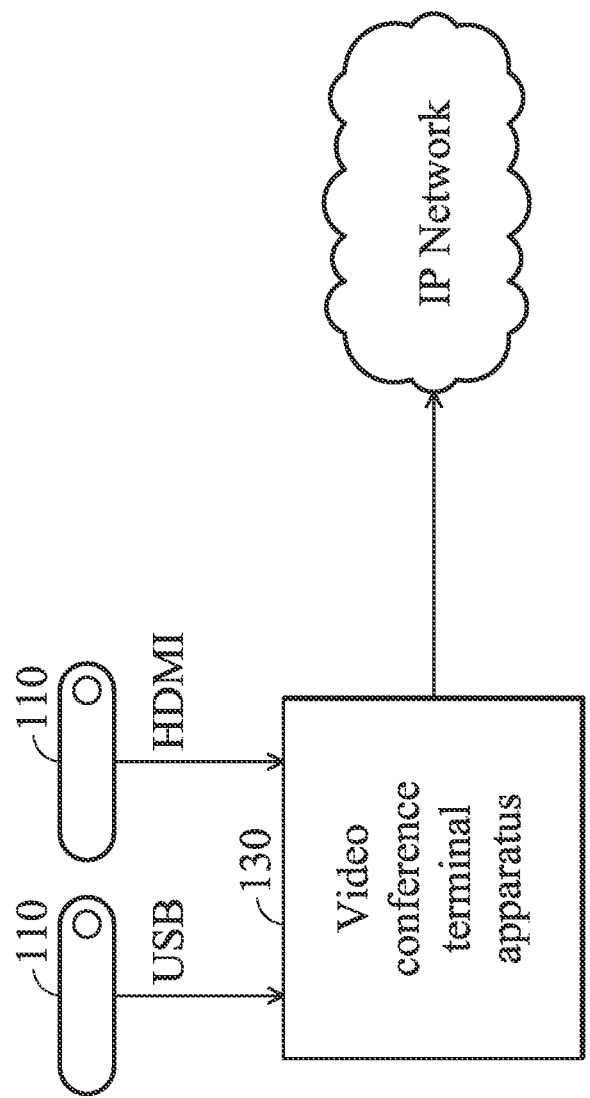
FIG. 7 illustrates a diagram of the video conference terminal apparatus receiving images from different multimedia capturing units according to an embodiment of the invention.

In another embodiment, the multimedia transmission interface 163 of the video conference terminal apparatus 130 may further be configured to receive video signals captured by various multimedia capturing units 110 in different angles, as illustrated in FIG. 7. For example, the data transmission interface of the multimedia capturing unit 110 may be a USB or HDMI interface (not limited), and the multimedia transmission interface 163 may also have USB and HDMI interfaces. Thus, the video conference terminal apparatus 130 may connect to at least two multimedia capturing units through the USB interface and/or the HDMI interface, and the user may select one or multiple video signal sources to be displayed on the local screen in the video conference. For example, when the users A and B are in the video conference, the user A may use another multimedia capturing unit (e.g. a digital video recorder) as another video/audio source, and transmit the captured video/audio signals to the video conference terminal apparatus 130 through the multimedia transmission interface 163 (e.g. USB or HDMI interface). Then, the user B may view the screen from the user A and from the digital video recorder simultaneously.

Figure 8:
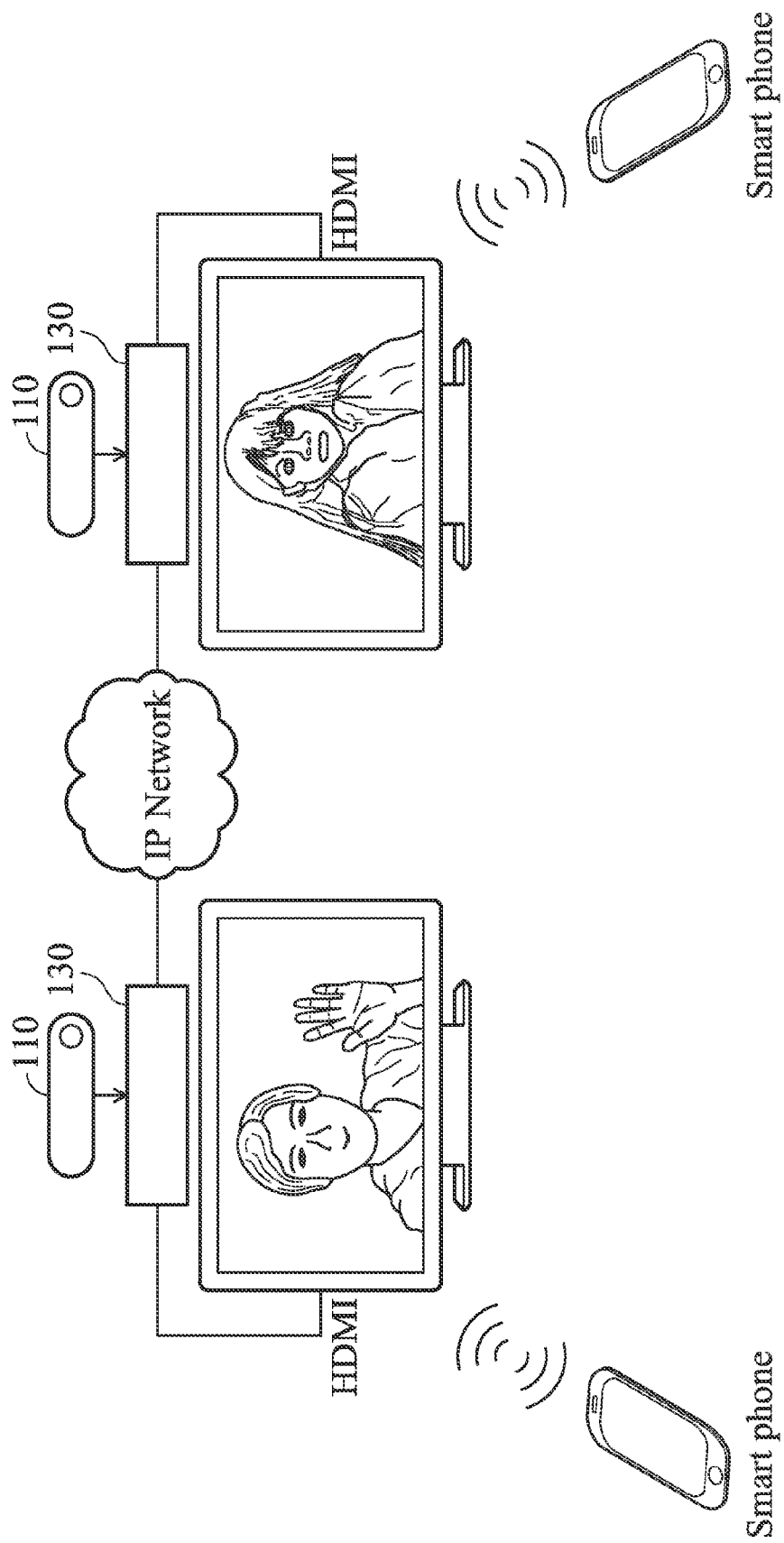
FIG. 8 illustrates a diagram of the connection of the smart phone and the video conference terminal apparatus in the video conference according to an embodiment of the invention.

In yet another embodiment, the video conference terminal apparatus 130 may connect to a smart phone with a wireless network (e.g. Wifi). For example, the user A may use a smart phone to transmit the audio/video signals to the video conference terminal apparatus 130. In addition, the multimedia capturing unit 110 of the user A may keep capturing images, and the video conference terminal apparatus 130 of the user A may connect to the video conference terminal apparatus 130 of the user B to conduct a video conference. It should be noted that, the user B may use the DECT telephone 120 to connect to the video conference terminal apparatus 130 thereof through the DECT interface 161, or use a smart phone to connect to the video conference terminal apparatus 130 thereof through the network processing unit 162 (e.g. Wifi). A display apparatus can be externally connected to the video conference terminal apparatuses of both the users A and B, and the video/audio signals in the video conference can be displayed on the display apparatus through the multimedia transmission interface (e.g. HDMI), as illustrated in FIG. 8. It should be noted that, the DECT telephone 120 and the smart phone may control the video conference terminal apparatus 130 simultaneously.

Figure 9:
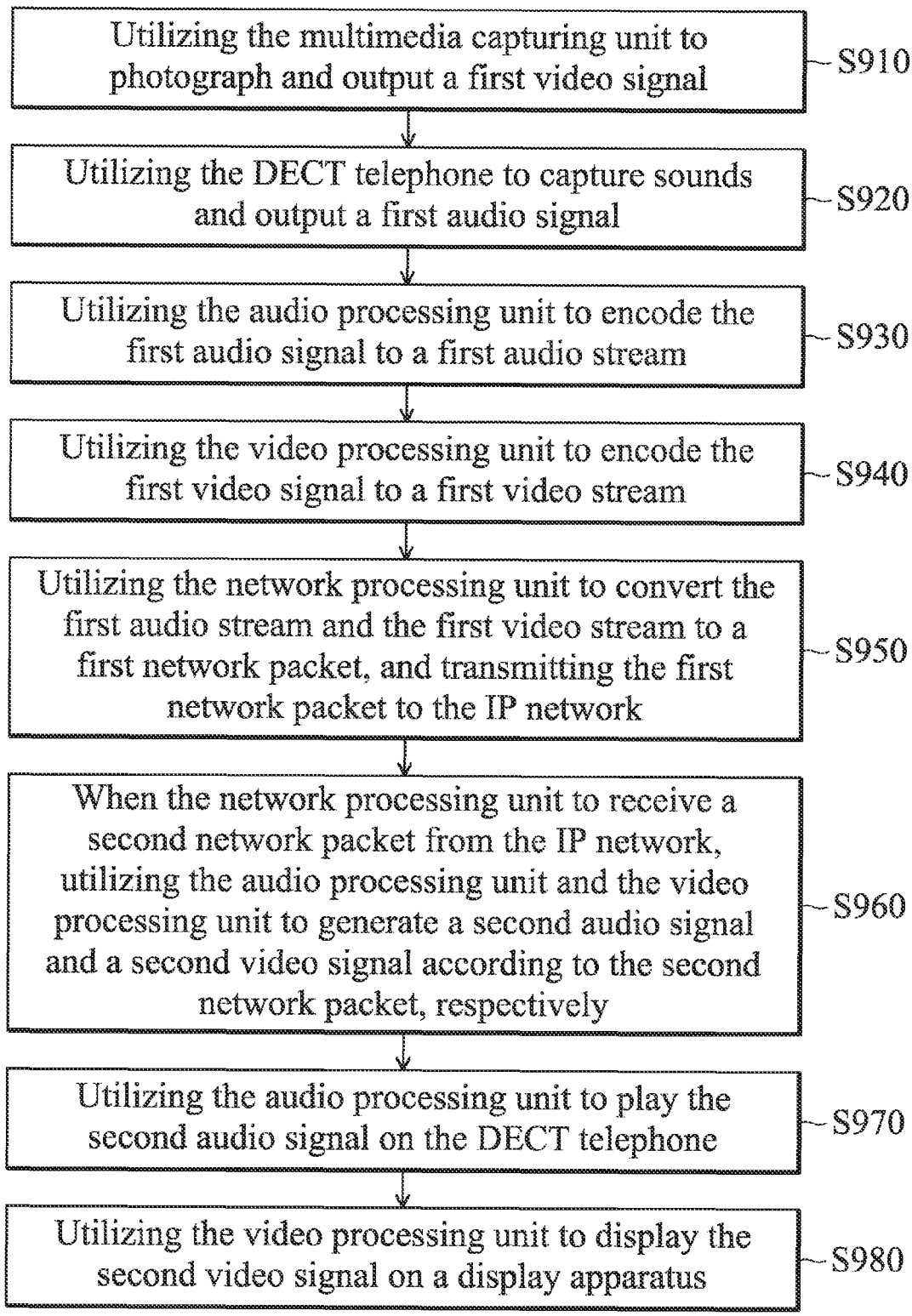
FIG. 9 illustrates a flow chart of the video conference method according to an embodiment of the invention.

FIG. 9 illustrates a flow chart of the video conference method according to an embodiment of the invention, wherein the video conference method is applied in the video conference system and the video conference terminal apparatus using the IP network. In step S910, the user may utilize the multimedia capturing unit 110 to photograph and output a first video signal. In step S920, the user may utilize the DECT telephone 120 to capture sounds and output a first audio signal. In step S930, the audio processing unit 140 may encode the first audio signal to a first audio stream. In step S940, the video processing unit may encode the first video signal to a first video stream. In step S950, the video conference terminal apparatus 130 may receive the first audio stream (e.g. AS1) and the first video stream (e.g. VS1) through the network processing unit 160, convert the first audio/video streams to a first network packet, and transmit the first network packet to the IP network. In step S960, when the network processing unit 160 receives a second network packet comprising a second audio stream (e.g. AS2) and a second video stream (e.g. VS2) from the IP network, the audio processing unit 140 and the video processing unit 150 may decode the second audio stream and the second video stream to generate a second audio signal and a second video signal, respectively. In step S970, the audio processing unit 140 may play the second audio signal on the DECT telephone 120. In step S980, the video processing unit 150 may display the second video signal on a display apparatus.

For those skilled in the art, it should be appreciated that the aforementioned embodiments in the invention describe different ways of implementation, and the each way of implementation of the video conference system and the video conference terminal apparatus can be collocated for usage. The video conference system 100 in the invention may use the video conference terminal apparatus and a common DECT telephone with an image capturing unit to conduct a video conference with other users, thereby having convenience and cost advantages.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conference system, built in an internet protocol (IP) network, comprising a multimedia capturing unit configured to photograph and output a first video signal; a digital enhanced cordless telecommunications (DECT) telephone configured to receive sounds and output a first audio signal; and a video conference terminal apparatus, comprising: an audio processing unit configured to encode the first audio signal to a first audio stream; a video processing unit configured to encode the first video signal to a first video stream; and a network processing unit configured to convert the first audio stream and the first video stream to a first network packet, and transmit the first network packet to the IP network, wherein when the network processing unit receives a second network packet from the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus; and wherein the video conference system further comprising: a smart phone, electrically connected to the video conference terminal apparatus, configured to execute a DECT simulation application to generate a control signal to control the video conference terminal apparatus.

2. The video conference system as claimed in claim 1, wherein the video processing unit further generates user interface information, and displays the user interface information on a display screen of the DECT telephone.

3. The video conference system as claimed in claim 1, wherein the multimedia capturing unit is further configured to receive sounds and output a third audio signal, wherein the audio processing unit further encodes the third audio signal to a second audio stream and the network processing unit further converts the second audio stream and the first video stream to a third network packet and transmits the third network packet to the IP network.

4. The video conference system as claimed in claim 1, wherein the audio processing unit further plays the second audio signal on the display apparatus.

5. The video conference system as claimed in claim 1, wherein the control signal is configured to control a display mode of the video conference terminal apparatus.

6. The video conference system as claimed in claim 1, wherein the network processing unit further transmits user interface display information to the DECT telephone and the display apparatus simultaneously, wherein the user interface display information comprises an IP address, a network mask, a gateway, a domain name server (DNS) of the network processing unit, and/or a telephone number dialed by the DECT telephone.

7. The video conference system as claimed in claim 1, further comprising:
a second multimedia capturing unit configured to photograph and output a third video signal, wherein the video processing unit is further configured to encode the first video signal and/or the third video signal to the first video stream alternatively.

8. The video conference system as claimed in claim 1, wherein the smart audio processing unit is further configured to encode the first audio signal or the third audio signal to the first audio stream alternatively.

9. The video conference system as claimed in claim 8, wherein the smart phone is further configured to photograph and output a fourth video signal and the video processing unit is further configured to encode the first video signal or the fourth video signal to the first video stream.

10. A video conference terminal apparatus applied in a video conference system built in an internet protocol (IP) network, comprising: an audio processing unit configured to encode a first audio signal received by a DECT telephone to a first audio stream; a video processing unit configured to encode a first video signal generated by a multimedia capturing unit to a first video stream; and a network processing unit configured to convert the first audio signal and the first video signal to a first network packet, and transmit the first network packet to the IP network, wherein when the network processing unit receives a second network packet from the IP network, the audio processing unit and the video processing unit generates a second audio signal and a second video signal according to the second network packet, respectively, wherein the audio processing unit plays the second audio signal on the DECT telephone and the video processing unit displays the second video signal on a display apparatus; and wherein the video conference terminal apparatus further comprising: a smart phone, electrically connected to the video conference terminal apparatus, configured to execute a DECT simulation application to generate a control signal to control the video conference terminal apparatus.

11. The video conference terminal apparatus as claimed in claim 10, wherein when the video processing unit further generates user interface information, and displays the user interface information on a display screen of the DECT telephone.

12. The video conference terminal apparatus as claimed in claim 10, wherein the multimedia capturing unit is further configured to receive sounds and output a third audio signal, wherein the audio processing unit further encodes the third audio signal to a second audio stream and the network processing unit further converts the second audio stream and the first video stream to a third network packet and transmits the third network packet to the IP network.

13. The video conference terminal apparatus as claimed in claim 10, wherein the audio processing unit further plays the second audio signal on the display apparatus.

14. The video conference terminal apparatus as claimed in claim 10, wherein the control signal is configured to control a display mode of the video conference terminal apparatus.

15. The video conference terminal apparatus as claimed in claim 10, wherein the network processing unit further transmits user interface display information to the DECT telephone and the display apparatus simultaneously, wherein the user interface display information comprises an IP address, a network mask, a gateway, a domain name server (DNS) of the network processing unit, and/or a telephone number dialed by the DECT telephone.

16. The video conference terminal apparatus as claimed in claim 10, further comprising:
a second multimedia capturing unit configured to photograph and output a third video signal, wherein the video processing unit is further configured to encode the first video signal and/or the third video signal to the first video stream alternatively.

17. The video conference terminal apparatus as claimed in claim 10, wherein the smart phone is further configured to receive sounds and output a third audio signal and the audio processing unit is further configured to encode the first audio signal or the third audio signal to the first audio stream alternatively.

18. The video conference terminal apparatus as claimed in claim 17, wherein the smart phone is further configured to photograph and output a fourth video signal and the video processing unit is further configured to encode the first video signal or the fourth video signal to the first video stream.

19. A video conference method applied in a video conference system built in an internet protocol (IP) network, wherein the video conference system comprises a multimedia capturing unit, a digital enhanced cordless telecommunications (DECT) telephone, and a video conference terminal apparatus, and the video conference terminal apparatus comprises an audio processing unit, a video processing unit and a network processing unit, the method comprising: utilizing the multimedia capturing unit to output a first video signal; utilizing the DECT telephone to output a first audio signal; utilizing the audio processing unit to encode the first audio signal to a first audio stream; utilizing the video processing unit to encode the first video signal to a first video stream; utilizing the network processing unit to receive the first audio stream and the first video stream, convert the first audio stream and the first video stream to a first network packet, and transmit the first network packet to the IP network; when the network processing unit receives a second network packet from the IP network, utilizing the audio processing unit and the video processing unit to generate a second audio signal and a second video utilizing the audio processing unit to play the second audio signal on the DECT telephone; and utilizing the video processing unit to display the second video signal on a display apparatus; and wherein the video conference method applied in the video conference system further comprises a smart phone electrically connected to the video conference terminal apparatus, and the method further comprises: utilizing the smart phone to execute a DECT simulation application to generate a control signal to control the video conference terminal.

20. The video conference method as claimed in claim 19, further comprising:
utilizing the video processing unit to generate user interface information; and
displaying the user interface information on a display screen of the DECT telephone.

21. The video conference method as claimed in claim 19, further comprising:
utilizing the multimedia capturing unit to receive sounds and output a third audio signal;
utilizing the audio processing unit to encode the third audio signal to a third audio stream; and
utilizing the network processing unit to convert the second audio stream and the first video stream to a third network packet and transmitting the third network packet to the IP network.

22. The video conference method as claimed in claim 19, further comprising:
utilizing the audio processing unit to play the second audio signal on the display apparatus.

23. The video conference method as claimed in claim 19, wherein the control signal is configured to control a display mode of the video conference terminal apparatus.

24. The video conference method as claimed in claim 19, further comprising:
utilizing the network processing unit to transmit user interface information to the DECT telephone and the display apparatus simultaneously,
wherein the user interface display information comprises an IP address, a network mask, a gateway, a domain name server (DNS) of the network processing unit, and/or a telephone number dialed by the DECT telephone.

25. The video conference method as claimed in claim 19, wherein the video conference system further comprises a second multimedia capturing unit, and the method further comprises:
utilizing the second multimedia capturing unit to output a third video signal; and
utilizing the video processing unit to encode the first video signal and/or the third video signal to the first video stream alternatively.

26. The video conference method as claimed in claim 19, further comprising: utilizing the smart phone to output a third audio signal; and utilizing the audio processing unit to encode the first audio signal or the third audio signal to the first audio stream alternatively.

27. The video conference method as claimed in claim 19, further comprising: utilizing the smart phone to photograph and output a fourth video signal; and utilizing the video processing unit to encode the first video signal or the fourth signal to the first video stream alternatively.

* * * * *